United States Patent
Hatch

[15] 3,675,936
[45] July 11, 1972

[54] TRACK PIN SEAL
[72] Inventor: Seymour A. Hatch, Maywood, Ill.
[73] Assignee: Chicago Rawhide Manufacturing Company, Chicago, Ill.
[22] Filed: Feb. 19, 1970
[21] Appl. No.: 12,803

Related U.S. Application Data
[62] Division of Ser. No. 713,077, March 14, 1968, Pat. No. 3,574,419.

[52] U.S. Cl. ............................................................277/94
[51] Int. Cl. .......................................................F16j 15/16
[58] Field of Search ...............277/92, 94, 165; 365/11, 14, 365/42, 58

[56] References Cited

UNITED STATES PATENTS

| | | | |
|---|---|---|---|
| 3,330,566 | 7/1967 | Roberts | 277/92 |
| 3,574,419 | 4/1971 | Hatch | 305/11 |
| 2,341,900 | 2/1944 | Boden | 305/11 |
| 2,906,562 | 9/1958 | Burgman | 305/11 |
| 2,911,840 | 11/1959 | Muller et al. | 305/11 |

*Primary Examiner*—Robert I. Smith
*Attorney*—Greist, Lockwood, Greenawalt & Dewey

[57] ABSTRACT

A protective seal unit for retaining grease in, and excluding abrasive particles from a track pin connecting two or more links, which, when connected together, form an endless crawler track for a track laying vehicle. The seal includes first and second collar members, each having radially and axially extending flanges and an elastromeric torsional deflection sealing element extending between the two radially extending flanges, connecting the two collars, and being spaced apart from the axially extending portions of the collars. Each collar is held in fixed relation relative to the link member with which it is associated, and the links are oscillated in relation to each other when the track moves over a drive sprocket or an idler.

9 Claims, 6 Drawing Figures

PATENTED JUL 11 1972 3,675,936

INVENTOR
SEYMOUR A. HATCH

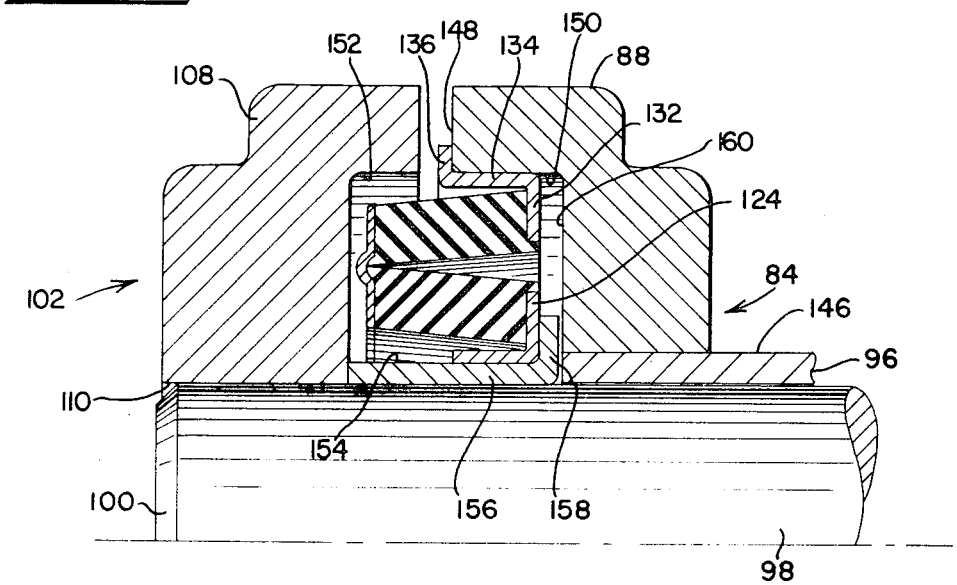
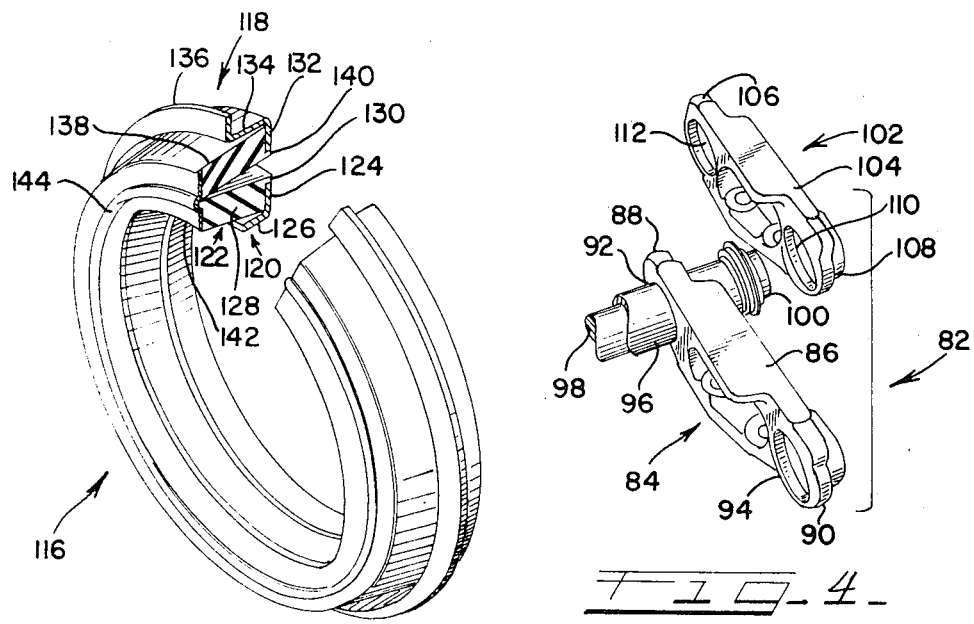
INVENTOR
SEYMOUR A. HATCH

TRACK PIN SEAL

This application is a division of Ser. No. 713,077 filed Mar. 14, 1968 and now U.S. Pat. No. 3,574,419.

BACKGROUND OF THE INVENTION

1. Field of the Invention

The field of the invention, in general, is that of seals which are adapted to retain grease or other lubricants inside an enclosed bearing area in which relative oscillatory motion occurs between two parts requiring lubrication, and which are adapted to exclude dirt, sand and other contaminants from entering the bearing area. More particularly, the field of the invention is that of seals for use with the track pins which form a part of an endless track by which track laying vehicles are driven. In the present invention, a torsionally deflectable rubber seal joins two flange members, each of which is mounted in fixed relation to one of a pair of relatively oscillatable members.

2. Description of the Prior Art

It is well known that track-laying or crawler type vehicles, particularly earth moving tractors and the like, are presently in widespread use in highway and building construction and in many other areas. Since such vehicles are used with the express purpose in mind of being operable under extremely adverse conditions of terrain and weather, it is essential that the elements thereof, particularly the propulsion components, be rugged and reliable in use. Accordingly, it is also essential that bearing surfaces of the vehicle tracks, and particularly the track pins, be protected from abrasion by a simple, reliable, effective and economical seal unit, for inclusion of lubricant and exclusion of abrasive material from these critical areas. Attempts to solve the problems associated with track pin seals for crawler type vehicles have been numerous and varied. Some prior art devices, for example, include seals in which a seal member makes sliding contact with a track pin along a circumferential surface thereof, or with a bushing associated with the track pin.

Other prior art efforts include compressively disposing rubber rings or like members between two relatively oscillatable links in tightly wedged relationship, thereby forming slidable sealing surfaces between the compressed rings and the recessed or counterbored portions of the track links.

Other known prior art constructions include metal members, usually of a generally frustro-conical shape, having two faces thereof meeting in an abutting or face to face relation, wherein the oscillating movement of the track links is permitted by sliding contact between the faces of the seal elements themselves or between the seal element and the side surface of the link bushing.

Torsional deflection seals are also known in the prior art, but most torsional deflection seals known in the prior art are less than entirely satisfactory, generally having relatively short lives because of nonuniform strain distributors and are characterized by difficulty of installation.

SUMMARY OF THE INVENTION

In view of the shortcomings of known prior art track pins seals, an object of the present invention is to provide a track pin seal unit which is reliable, simple and economical.

A further object of this invention is to use an annular axial member of generally cylindrical shape as the positive sealing deflection member to provide uniform strain distribution thus avoiding strain concentrations which have created reliability problems in prior art designs.

Another object is to provide a seal in which two collars are held against rotation, one in each of a pair of track links, and are connected to each other by a flexural seal member.

A further object is to provide a torsional deflection seal which is particularly designed to reduce abrasive wear on the outside surfaces of the sealing member and the exposed surfaces of the collar supporting the seal.

An additional object of the invention is to provide a track pin seal unit which can be installed during track chain build-up with a minimum of care and specialized tooling.

A still further object of the invention is to provide a track pin seal in which the seal collars are stamped metal rings carried by portions of the track links, and in which the seal collars, in some embodiments, need not be machined to size.

Another object is to provide a seal in which the collar elements are not carried directly by the pin or its counterpart, in a typical embodiment.

Another object is to provide a track pin seal unit in which the two collars connected by a torsionally deflectable seal element also include two closely spaced apart flanges which are adapted to assist the installation of the seal, and which may be abraded away after use without damage to the track pins or the seal assembly.

These objects, and other objects of the invention are achieved by providing a protective seal unit for a pair of relatively oscillatable elements forming a portion of a vehicle track, in which two collar members are joined to a torsionally deflectable seal member extending between radial flanges on the two collars and in which the seal member is spaced apart from axially extending flanges on the collar units.

The manner in which the present invention achieves its above stated objects and other objects which are inherent therein which will become more apparent when considered in conjunction with a description of the preferred embodiments of the invention, and as shown in the drawings, in which like reference characters denote corresponding parts throughout.

BRIEF DESCRIPTION OF THE DRAWINGS

FIG. 4 is an exploded perspective view, showing a modified track pin seal unit of the invention, and the relation thereof to a track pin, two track links, and a pin bushing.

FIG. 5 is an enlarged isometric view, partly in section, showing a different embodiment of the seal unit of the present invention.

FIG. 6 is an enlarged vertical sectional view of the components shown in FIG. 4 and 5.

DESCRIPTION OF THE PREFERRED EMBODIMENTS OF THE INVENTION

Figure 1:
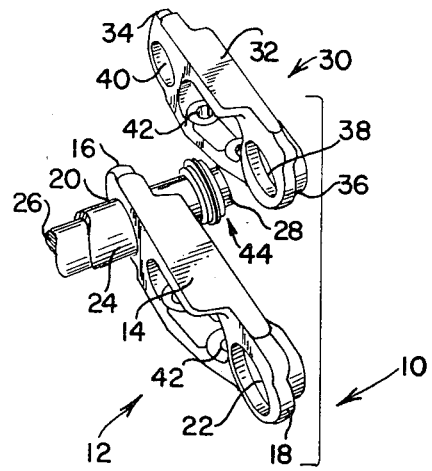
FIG. 1 is an exploded perspective view, showing the relation of the pin seal unit of the invention to a track pin, track links, and a track pin bushing.

Referring now to the drawings in greater detail, FIG. 1 shows the relation of certain parts of a track assembly 10, including the track pin seal of the present invention. This assembly 10 includes a first or inner link 12, having a main body portion 14, and reduced thickness front and rear end portions 16, 18. The front end portion 16 includes an opening 20 having a given diameter, and the rear end portion 18 includes an opening 22 having a diameter somewhat smaller than that of the opening 20, as will appear more fully herein.

A track pin bushing 24, of hollow tubular construction, extends through the opening 20, and a track pin 26 having an outer end portion 28 in slidably received inside the bushing 24. A second or outer link 30 having a main body portion 32, a reduced thickness front portion 34 and a reduced thickness rear portion 36 is shown disposed with the opening 38 in the end portions 36 aligned with the end portion 28 of the track pin 26. The front end portion 34 has an opening 40, of larger diameter than opening 38, disposed therethrough, for receiving another bushing and pin assembly so as to form a plurality of links such as the links 12, 30, into a continuous track assembly. Track elements such as lugs or the like (not shown) may be attached to the links 12, 30 by means of the fastening openings 42. The seal assembly 44 is shown disposed over the outer surface of the bushing 24. Thus, openings 22 and 38 of a size to accommodate only the pins, and openings 20 and 40 are sized to receive bushings.

Figure 2:
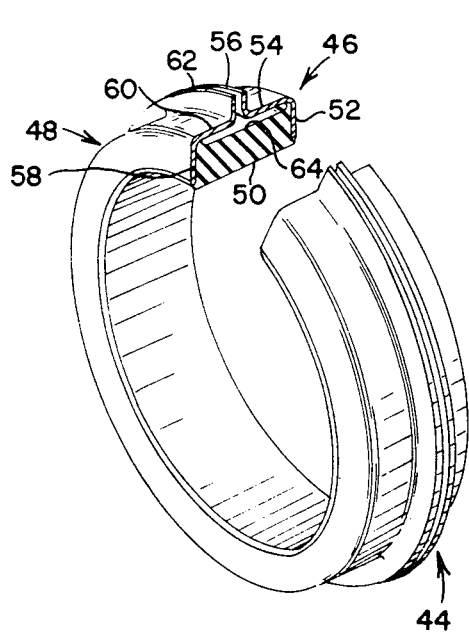
FIG. 2 is an enlarged isometric view, partly in section, showing the protective seal unit of the present invention.

Referring now to FIG. 2, the seal assembly 44 is shown to comprise a first or inner collar 46, a second or outer collar 48, and a seal element 50. The inner collar 46 comprises a radially extending flange 52, an axially extending flange 54, and a radially extending auxiliary or mounting flange member 56.

The outer collar 48 is substantially a mirror image of the inner collar 46, and includes a radially extending flange 58, an axially extending flange 60, and a radially extending auxiliary or mounting flange 62. The seal element 50 is a generally ring-shaped rubber member having its outer ends attached to the radially extending flanges 52, 58, and having an outer surface 64 thereof spaced inwardly from the inner surfaces of the axially extending flanges 54, 60. In a typical embodiment, the collars 46, 48 are stamped from steel of about 0.060 inches in thickness, and a small spacing between the collars 46, 48 and the surface 64.

Figure 3:
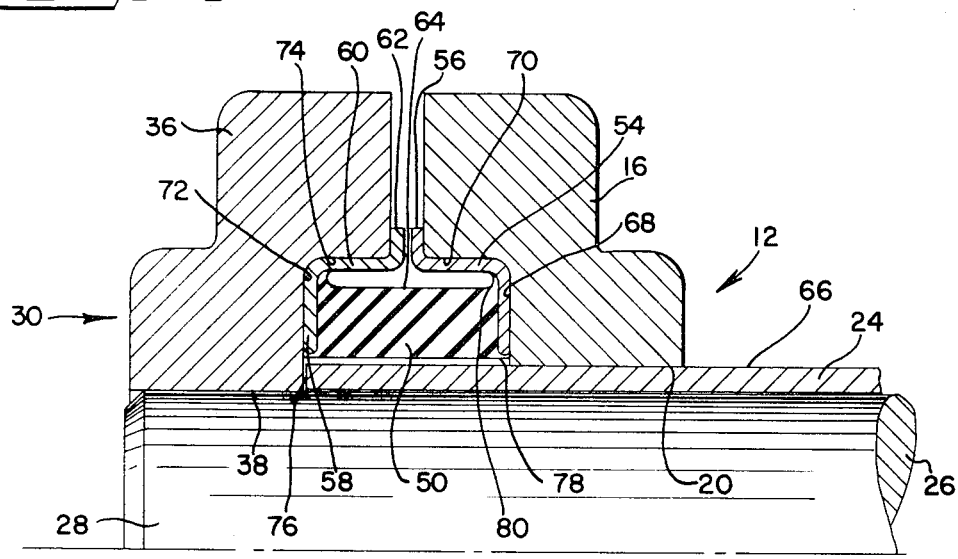
FIG. 3 is an enlarged vertical sectional view showing portions of the components shown in FIG. 1.

Referring now to FIG. 3, the installation of the track pin seal unit of the invention is shown. The reduced thickness end portion 16 of the inner link 12 has the opening therethrough sized so as to accommodate the outer surface 66 of the bushing 24 with a tight press fit, thus holding the bushing 24 and the link 12 relatively fixed in relation to each other. A radially extending surface 68 and an axially extending surface 70 in the end 16 of the link 12 define a counterbore which snugly receives the flanges 52, 54, of the inner collar 46, thereby holding the collar 46 in place in relation to the inner link 12.

Locking or pressing the inner collar 46 into place is accomplished by pushing axially inwardly on the flange 58 of the outer collar 48, causing forces to be transmitted through the auxiliary or mounting flanges 62, 56, upon slight compression of the seal element 50.

A radially extending surface 72 and an axially extending surface 74 define a counterbore in the reduced thickness end portion 36 of the outer link 30, and this counterbore accommodates the flanges 58, 60 of the outer collar 48. The opening 38 in the end portion 36 of the link 30 is sized so as to receive the end portion 28 of the track pin 26 in a tight press fit. The outer collar 48 is tightly pressed into the counterbore formed by the surfaces 72, 74, thus securing the outer collar in fixed relation to the outer link 30. Since the bushing 24 fits over the pin 26 only in the region of the opening 20, this opening is larger than the opening 38, where only the pin 26 is engaged.

The outer collar 48 is pressed into place simultaneously with the fitting of the link 30 over the end 28 of the pin 26. The combination of the bushing end 76 and the abutting flanges 56, 62 serve to limit axial movement during installation, to insure that correct alignment of the links takes place.

When the links 12, 30 undergo oscillation relative to each other, as the track moves over a roller or sprocket, the outer link 30, the outer collar 48, and the track pin 26 move as a unit, and the inner link 12, the inner collar 46, and the bushing 24 move as a unit, and relative motion occurs as the seal element 50 undergoes torsional deflection within itself. Relative motion also occurs at the lubricated interface between the inside of the bushing 24 and the outside surface of the track pin 26.

Since the metal link parts are all press fitted with respect to their respectively associated collars, and with respect to either a bushing or a track pin, no abrasive material can enter the sealed system as long as the rubber seal retains its integrity and remains bonded to the flanges 52, 58. A principal feature of this construction is that the seal does not contain any metal-to-metal or rubber-to-metal sliding contact, except for the auxiliary or mounting flanges 56, 62, which may be, and normally are, abraded away shortly after installation of the seal unit.

The function of the spacing between the surface 64 and the flanges 54, 60 is that dirt particles, bits of sand, or the like, which enter this area are, generally speaking, substantially smaller than this distance. Therefore, the particles are not rubbed across the inner surface of the flanges 54, 60 while in contact with the surface 64. Those particles which are trapped in this region are generally held somewhat stationary with respect to the surface 64 or a portion of the flange, and relative motion occurs between those particles so held and other particles located between the flanges but not contacting either the flanges 54, 60 or the outer surface 64 of the seal element 50.

FIG. 3 also shows that there are bonding overlap areas 78, 80, of substantial extent where the seal element 50 joins the flanges 52, 54, and 58, 60. These areas, which are typically of the order of 0.100 inches in width, are preferred for increasing the area of the bond, for providing the spacing between the seal 50 and the flanges 54, 60, and for simplifying the molding and curing process.

In the use of the novel seal, it has been demonstrated that very effective sealing may be maintained even under very severe conditions.

Referring now to FIG. 4, another embodiment of the invention is shown. In this version, a track pin and seal assembly 82 includes a first or inner link 84 having a main body portion 86 and reduced thickness front and rear end portions 88, 90. The front end portion 88 includes an opening 92 having a given diameter, and the rear end portion 90 includes an opening 94 having a diameter somewhat smaller than that of the opening 92, as will appear more fully herein.

A track pin bushing 96, of hollow tubular construction, extends through the opening 92, and a track pin 98 having an outer end portion 100 is slidably received inside the bushing 96. A second or outer link 102 having a main body portion 104, a reduced thickness front portion 106 and a reduced thickness rear portion 108 is shown disposed with the opening 110 in the end portion 108 aligned with the end portion 100 of the track pin 98. The front end portion 106 has an opening 112, of larger diameter than opening 110, disposed therethrough, for receiving another bushing and pin assembly so as to form a plurality of links such as the links 84, 102, into a continuous track assembly. Track elements such as lugs or the like (not shown) may be attached to the links 84, 102 by means of the fastening openings 114. A seal assembly 116 is shown disposed over the end portion 100 of the track pin 98.

Referring now to FIG. 5, the seal assembly 116 is shown to comprise a first or radially outer collar 118, a second or radially inner collar 120, and a seal assembly 122. The inner collar 120 comprises a radially extending flange 124, an axially extending flange 126, and an inner frustro-conical sealing ring 128, having a face 130 thereof at least partially bonded to the flange 124.

The outer collar 118 is a partial mirror image of the inner collar 120, and includes a radially extending flange 132, an axially extending flange 134, and a radially extending auxiliary or mounting flange 136. Bonded to the radial flange 132 is a generally frustro-conical sealing ring 138 having a rear face 140 thereof at least partially attached to the flange 132.

A generally flat seal ring member 142 is bonded to both rings 128, 138, thereby forming the seal assembly 122 into an integral unit. The ring member 142 may include a locating rib 144 thereon, if desired.

Referring now to FIG. 6, the installation of the track pin seal unit of this embodiment of the invention is shown. The reduced thickness end portion 88 of the inner link 84 has the opening 92 therethrough sized so as to accommodate the outer surface 146 of the bushing 96 with a tight press fit, thus holding the bushing 96 and the link 84 relatively fixed in relation to each other. A radially extending surface 148, and an axially extending surface 150 which defines a counterbore in the end 88 of the link 84, snugly receive the flanges 136, 134, of the outer collar 118, thereby holding the collar 118 in place in relation to the inner link 84.

Pushing axially inwardly on the flange 136 of the outer collar 118 serves to lock the collar in place.

An axially extending surface 152 defines a counterbore in the reduced thickness end portion of the outer link 102, and this counterbore accommodates portions of the sealing rings 128, 138, as well as the ring 142. The opening 110 in the link 108 is sized so as to receive the end portion 100 of the track pin 98 in a tight press fit. The axial flange 126 of the inner collar 120 is tightly pressed over the outside 154 of a seal support sleeve 156, containing an optional end flange 158, which engages the radial flange 124. The sleeve 156 is in turn press fitted over the pin 98, thus securing the inner collar 120 in fixed relation to the pin 98 and the outer link 102. Since the bushing 96 fits over the pin 98, and the link 84 over the bushing 98, the bore 92 is larger than the bore 110, which encircles only the bushing 98.

This construction shown in FIGS. 4 through 6 is used where relatively more radial seal space is available than axial space, and the first embodiment is preferred where relatively more axial seal space is available.

The provisions of the end flange 158 is optional. As an alternate construction, this flange 158 is eliminated, and the radial flange 132 of the outer collar 118 engages, or nearly engages the radial surface 160 of the inner link 84, the flange 134 being of substantially equal width, in such case, to the surface 150.

When the links 84, 102 undergo oscillation relative to each other, as the track moves over a roller or sprocket, the outer link 102, the inner collar 120, the sleeve 156, and the track pin move as a unit, and the inner link 84, the outer collar 118, and the bushing 98 move as a unit. Relative motion occurs as the seal elements 128,138 undergo torsional deflection within themselves, and relative motion also occurs at the lubricated interface between the inside of the bushing 96 and the outside surface of the track pin 98. Since the metal link parts are all press fitted with respect to their respectively associated collars, and with respect to either a bushing or a track pin, no abrasive material can enter the sealed system as long as the rubber seal retains its integrity and remains bonded to the flanges 52, 58, and the ring 142. A principal feature of this construction is that the seal does not contain any metal-metal or rubber-to-metal sliding contact, except in the case of the flange 136, which may be and normally is abraded away shortly after installation of the seal unit.

In the present invention, it is preferred that the sealing rings themselves be cylindrical or nearly cylindrical in shape. This is because stress concentrations are most fully and equally distributed in a cylinder which receives torsional stress applied to the ends thereof, whereas a disc-shaped or conical sealing member tends to have stress concentrated at an inner or outer edge, where greater relative deflection takes place. Accordingly, in the embodiment shown in FIGS. 4 through 6, although the rings 128, 138 are somewhat tapered, they are preferably as nearly cylindrical as possible, tapering only to the extent that working clearance therebetween is necessary, and allowing for the radial offset between the inner and outer collars.

If the outer collar is spaced a substantial distance from the inner collar, it is ordinarily preferred to space the ends of the rings joined to the seal ring 142 apart from each other radially, rather than having the seal members sharply tapered so that the outer edges of the inner ring would meet the inner edges of the outer ring. However, the preferred construction of seal assemblies according to the present invention calls for minimum radial spacing between the inner and outer collars.

A seal unit made in accordance with the modified construction just described also gives excellent performance under extremely adverse conditions. In fact, tests indicate, even under severe use, the track pin seals made according to the present invention will last as long as the track assembly itself. For example, seals made according to the present invention have withstood well over 10 million cycles, and even much more, without use of failure.

As pointed out above, although the sizes and dimensions of the components of the invention are not critical, a normal track pin seal unit is from about 1½ to 2½ inches in diameter, and the stock from which the collars are stamped in normally a steel material of from about 0.040 to 0.060 inches in thickness. Although the spacing between the axial flanges and the rubber rings was stated above to be about 0.100 inches or more, this distance may in some cases be considerably less, although it is not preferred that such distance be less than about 0.040 inches.

It is preferred, in keeping with the present invention, that a nitrile or similar rubber be used in the construction of these seals, but the selection of materials is not an essential feature of the invention.

It will thus be seen that the present invention provides a novel track pin seal unit having a number of novel features, advantages and characteristics. Having completed a disclosure of this invention so that those skilled in the art may practice the same, it is contemplated that modifications and variations thereof may be made by those skilled in the art, without departing from the spirit of the invention or the scope of the appended claims.

I claim:

1. A protective seal assembly for disposition between first and second oscillatable elements forming a portion of a vehicle track, said seal assembly comprising, in combination, a first collar member including radially and axially extending flanges adapted to be fixedly and received by said first element, a second collar spaced apart from said first collar and having radially and axially extending flanges adapted to be fixedly received by said second element, a resilient seal unit extending from said radially extending flange of said first collar to said radially extending flange of said second collar and being bonded to each of said flanges along substantial portions thereof, said resilient seal unit having at least portions of a generally axially extending surface thereof spaced radially apart both in use and at rest from each of said axially extending flanges on said collars, whereby relative oscillation of said elements causes torsional deflection of said seal unit and whereby said spacing between said seal unit and said flanges minimizes abrasive wear on said seal unit and said flanges.

2. A protective seal assembly as defined in claim 1 in which said first collar comprises an outer collar, said second collar comprises an inner collar disposed radially inwardly of and concentric with said outer collar with said axially extending flanges on said collars disposed generally facing each other in radially spaced apart relation, and wherein said resilient seal unit comprises two generally ring-like seal elements or said ring-like seal elements having one axially facing, radially extending end face thereof bonded to one of said radially extending flanges on said collar units.

3. A protective seal assembly for disposition between first and second oscillatable elements forming a portion of a vehicle track, said seal assembly comprising, in combination, a first outer collar member including, radially and axially extending flanges adapted to be fixedly received by said first element, a second, inner collar spaced radially inwardly apart from said first collar, being concentric therewith and having radially and axially extending flanges adapted to be fixedly received by said second element, said axial flanges facing each other, a resilient seal unit comprising two generally ring-like elements, one of said elements having an axially facing, radially extending end portion bonded to said radial flange of one of said collars along a substantial portion of said flange, the other of said elements having a radially extending, axially facing end portion bonded to said radial flange of said second collar along a substantial portion of said flange, each of said elements having another axially facing, radially extending end face portion, and a relatively rigid sealing ring unit, both of said other end face portions of said elements being bonded to said seal ring unit, thereby joining said seal elements to said ring unit and forming a single composite seal unit.

4. A protective seal assembly as defined in claim 3 in which said ring-like seal elements are in the form of slightly tapering, frusto-conical resilient seal rings.

5. A vehicle track assembly comprising inner and outer track links relatively oscillatable with respect to each other, recesses disposed in each of said links with the open portions of said recesses facing each other in opposed relation, bushing means tightly press-fitted into said first link, track pin means tightly press fitted into said second link and slidingly received in said bushing means held in said first link, said track pin means thereby joining said first and second links, a seal assembly, including a first collar having radially and axially extending flanges fixedly held in place in relation to said first link, a second collar spaced apart from said first collar and having radially and axially extending flanges and being held in fixed relation to said second link, a resilient seal unit extending between said radially extending flange on said first collar and said radially extending flange on said second collar, and being generally disposed within said two recesses, with parts of the generally axially extending surface portion of said resilient seal unit being radially spaced apart from each of said axially extending flanges, whereby oscillation of said links torsionally deforms said resilient seal unit without rubbing said axially extending surface portions of said seal unit against said axially extending flanges of said collars.

6. A vehicle track assembly as defined in claim 5, in which said track pin means includes a track pin element and a sleeve means tightly received over said track pin element, said sleeve means being disposed axially inwardly from said second link, and having an axially inwardly facing end portion thereof adapted to be received in at least occasional oscillating contact with said bushing means.

7. A vehicle track assembly as defined in claim 5 in which said first collar comprises an outer collar, said second collar comprises an inner collar disposed radially inwardly of and concentric with said outer collar, with said axially extending flanges on said collars disposed generally facing each other in radially spaced apart relation, and wherein said seal assembly comprises two generally ring-like seal elements, each of said elements having one axially facing, radially extending end face thereof bonded to one of said radially extending flanges on said collar units.

8. A vehicle track assembly as defined in claim 7 in which each of said generally ring-like seal elements includes a second, axially facing, radially extending end face portion, and which further includes a generally flat, radially extending seal ring member, said seal ring member having one axially facing surface thereof bonded to said second end face portions, thereby joining said ring-like seal elements to each other.

9. A vehicle track assembly as defined in claim 8 in which said generally ring-like seal elements are in the form of slightly tapering, frustro-conical resilient seal rings.

* * * * *